(12) United States Patent
Miller et al.

(10) Patent No.: US 10,649,198 B2
(45) Date of Patent: May 12, 2020

(54) SAMPLE PROCESSING AND ANALYSIS METHODS AND APPARATUS

(71) Applicant: Battelle Memorial Institute, Richland, WA (US)

(72) Inventors: Micah D. Miller, Richland, WA (US); James Preston McKinley, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 782 days.

(21) Appl. No.: 15/068,447

(22) Filed: Mar. 11, 2016

(65) Prior Publication Data

US 2017/0261740 A1  Sep. 14, 2017

(51) Int. Cl.
| | |
|---|---|
| *G06K 9/00* | (2006.01) |
| *G02B 21/36* | (2006.01) |
| *G01N 1/28* | (2006.01) |
| *G02B 21/34* | (2006.01) |

(52) U.S. Cl.
CPC ......... *G02B 21/367* (2013.01); *G01N 1/2813* (2013.01); *G02B 21/34* (2013.01); *G01N 2001/282* (2013.01)

(58) Field of Classification Search
USPC .......................................................... 382/141
See application file for complete search history.

(56) References Cited

U.S. PATENT DOCUMENTS

| | | | |
|---|---|---|---|
| 5,905,266 A | 5/1999 | Larduinat et al. | |
| 6,745,067 B1* | 6/2004 | Zavislan | A61B 5/0066 |
| | | | 600/473 |
| 6,804,683 B1* | 10/2004 | Matsuzaki | G06F 17/30256 |
| 7,305,112 B2 | 12/2007 | Curry et al. | |
| 8,620,065 B2 | 12/2013 | Pietsun et al. | |
| 8,837,795 B2 | 9/2014 | Sievers et al. | |
| 9,202,105 B1* | 12/2015 | Wang | G06Q 20/4014 |
| 9,719,801 B1* | 8/2017 | Ferguson | G01C 25/00 |
| 2003/0210812 A1* | 11/2003 | Khamene | A61B 90/36 |
| | | | 382/128 |
| 2005/0182518 A1 | 8/2005 | Karlsson | |
| 2005/0207617 A1* | 9/2005 | Sarnoff | G01S 5/04 |
| | | | 382/103 |
| 2008/0071507 A1* | 3/2008 | Hodgins | G01S 5/16 |
| | | | 703/6 |

(Continued)

FOREIGN PATENT DOCUMENTS

WO  PCT/US2017/021162  9/2018

OTHER PUBLICATIONS

EP EP 1113749 Full Reference, Jul. 11, 2001, Lucid Inc.

(Continued)

*Primary Examiner* — Stephen P Coleman
(74) *Attorney, Agent, or Firm* — Wells St. John P.S.

(57) ABSTRACT

Sample handling, processing and analysis methods and apparatus are described. According to one aspect, a sample processing method includes providing a sample, providing a reference frame which comprises a plurality of markers arranged in a predefined pattern, wherein individual ones of the markers are uniquely identifiable from others of the markers, and associating the reference frame comprising the markers with the sample. The markers are amenable to human or machine reading and for computational manipulation in some examples.

30 Claims, 11 Drawing Sheets

(56) References Cited

U.S. PATENT DOCUMENTS

2011/0177548 A1    7/2011   Graham et al.
2014/0049818 A1    2/2014   Schlaudraff
2015/0026785 A1*   1/2015   Soon-Shiong ..... G06Q 30/0207
                                                                                                                        726/7

OTHER PUBLICATIONS

WO PCT/US2017/021162 Search Rept., dated Jun. 9, 2017, Battelle Memorial Institute.
WO PCT/US2017/021162 Writ. Opin., dated Jun. 9, 2017, Battelle Memorial Institute.
WO WO 2004/034012 Full Reference, Apr. 22, 2004, Virtual Arrays, Inc.
Galeano et al., "Position-Referenced Microscopy for Live Cell Culture Monitoring", Biomedical Optics Express vol. 2, No. 5, Apr. 25, 2011, United States, pp. 1307-1318.
Sandoz et al., "Position Referencing in Opitcal Microscopy Thanks to Sample Holders with Out-of-Focus Encoded Patterns", Journal of Microscopy vol. 225, Pt. 3, Mar. 2007, United Kingdom, pp. 293-303.

* cited by examiner

| Position | Binary # | | Block |
|---|---|---|---|

Block columns: 12 9 6 3 0

| Position | I | Binary # |
|---|---|---|
| 0 | 0 | 0000 |
| 1 | 0 | 0001 |
| 2 | 0 | 0010 |
| 3 | 0 | 0011 |
| 4 | 0 | 0100 |
| 5 | 0 | 0101 |
| 6 | 0 | 0110 |
| 7 | 0 | 0111 |
| 8 | 1 | 0000 |
| 9 | 1 | 0001 |
| 10 | 1 | 0010 |
| 11 | 1 | 0011 |
| 12 | 0 | 1100 |
| 13 | 0 | 1101 |
| 14 | 0 | 1110 |
| 15 | 0 | 1111 |
| 16 | 1 | 0000 |
| 17 | 1 | 0001 |
| 18 | 1 | 0010 |
| 19 | 1 | 0011 |
| 20 | 1 | 0100 |
| 21 | 1 | 0101 |

SAMPLE PROCESSING AND ANALYSIS METHODS AND APPARATUS

STATEMENT AS TO RIGHTS TO INVENTIONS MADE UNDER FEDERALLY-SPONSORED RESEARCH AND DEVELOPMENT

This invention was made with Government support under Contract DE-AC0576RLO1830 awarded by the U.S. Department of Energy. The Government has certain rights in the invention.

TECHNICAL FIELD

This disclosure relates to sample processing and analysis methods and apparatus.

BACKGROUND OF THE DISCLOSURE

Observation and location are two aspects of material sample analysis. For observation alone, the geometric attributes of the sample are recorded, e.g., as a photograph or photomicrograph, to allow the useful derivation of information from the observed sample. A difficulty arises in defining locations of features of interest upon or within the sample, which is necessary to record their attributes. In addition, it may be necessary to objectively (numerically) describe changes to the sample if it has been somehow altered, intentionally (e.g., as in experimentation) or unintentionally (e.g., as a result of aging).

Various instruments may be used for processing and analyzing samples, such as tissues of organisms or other subjects of interest, for various purposes. For example, in one application, it may be desired to examine and identify objects of interest in the samples themselves, and thereafter locate the objects of interest perhaps using a different instrument than that originally used to identify and locate the objects of interest. A common problem in manual and automated microscopy is how to determine sample location and orientation while working across multiple magnifications. In addition, samples may be deformed, damaged, altered or changed during processing or analysis of the samples which may increase the difficulty of finding objects of interest within the samples.

At least some aspects of the disclosure are directed towards methods and apparatus for processing and analyzing samples including identifying and locating targets of interest within the samples. Some aspects of this disclosure describe methods for marking samples or sample substrates, which may be of arbitrary size, for the purpose of encoding location and/or determining the degree of deformation within a sample or substrate of interest. In addition, some example marking systems discussed herein have the attributes of being machine or human readable, arbitrarily scaled, usable to locate recorded positions even if the sample or substrate are disassembled, usable to quantify deformation and/or useable to reassemble the marked sample after either deformation or disassembly. Other aspects and embodiments of the disclosure are described below.

BRIEF DESCRIPTION OF THE DRAWINGS

Example embodiments of the disclosure are described below with reference to the following accompanying drawings.

Once assembled, FIGS. 6A1-6A3 are an illustrative representation of markers within plural sub-areas of a reference frame according to one embodiment.

FIG. 7 is an illustrative representation of arrangement of markers according to a sequence according to one embodiment.

DETAILED DESCRIPTION OF THE DISCLOSURE

This disclosure is submitted in furtherance of the constitutional purposes of the U.S. Patent Laws "to promote the progress of science and useful arts" (Article 1, Section 8).

At least some aspects of the disclosure are directed towards apparatus and associated methods for processing and analyzing a sample. A sample may be any physical object that may be inspected through direct or instrumental means (e.g., photography), analyzed numerically for deformation or lack of deformation, including physical distortion or disassembly, or which contains locations used for observation or analysis. It is often desired to identify different targets of interest within samples being processed and different embodiments described herein are directed towards marking systems and methods which include associating a reference frame with a sample to be processed and which may be used to assist with identification of different locations or portions of the sample, including targets of interest within the sample, during processing of the sample. The reference frame includes a plurality of markers which are associated with different locations of the sample in some of the embodiments described below. As described in some example embodiments of the disclosure below, the association of the reference frames and markers with the samples creates virtual coordinate systems for the respective samples to assist with locating targets of interest and which are independent of other coordinate systems, such as those of the instruments being used to process the samples.

In some embodiments, a plurality of samples may be provided, for example on one or more sample holders having a relatively large filed compared with the samples themselves (e.g., where sub-µm objects are located on an observation platform such as an electron microscopy planchette or glass microscope slide). In these illustrative examples, the targets to be located upon the sample holder may be the samples themselves.

The markers are uniquely identifiable from one another in at least one embodiment. In some embodiments, the markers are encoded on the sample or sample holder by means of marking or embedding. In an example embedding embodiment, the encoding provides robustness relative to mechanical or chemical damage of the sample. According to some embodiments, human or robotic operators may use the reference frame and markers to identify the locations of targets of interest in the samples and repeatedly find the locations of the targets after identification with micron-scale accuracy. Targets of a sample may be located using the reference frame and markers even after the sample itself has been deformed, stretched, dissected, or otherwise changed as described below according to some embodiments. The locations of the targets may thus be used to quantify deformation subsequent to target marking in one embodiment.

Figure 1:
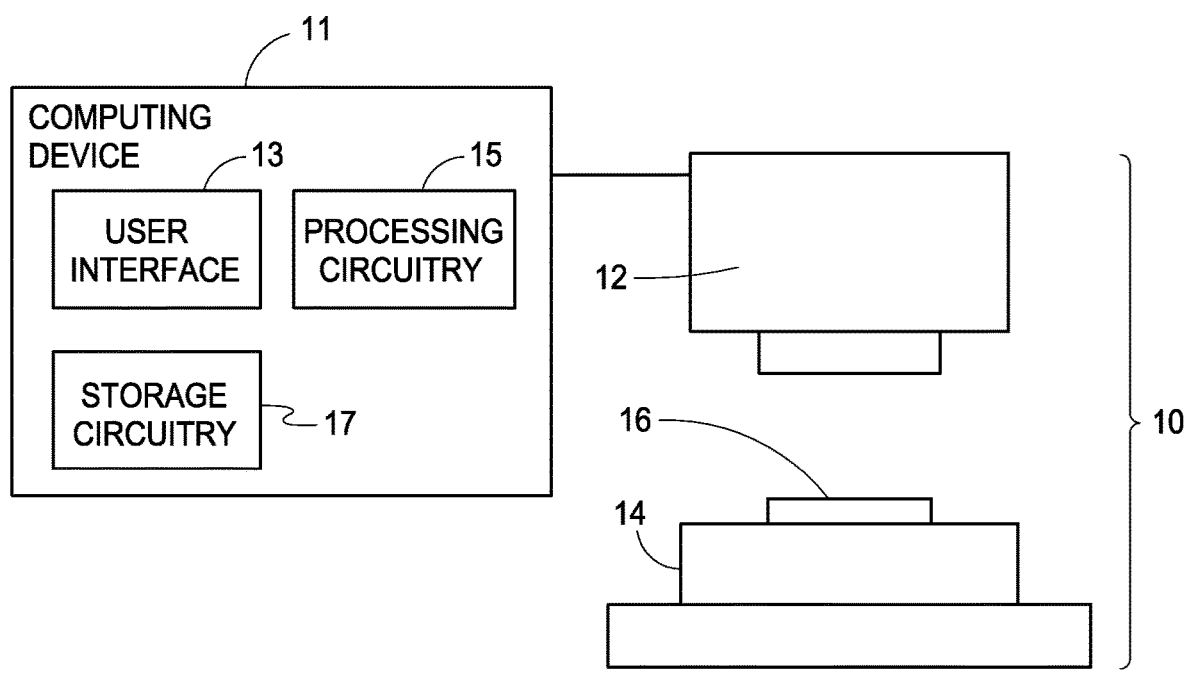
FIG. 1 is an illustrative representation of an instrument which is configured to perform operations with respect to a sample according to one embodiment.

Referring to FIG. 1, an illustrative representation of an instrument 10 which is configured to perform at least one or more processing operations with respect to a sample 16 is shown according to one embodiment. In the illustrated embodiment, instrument 10 includes a processing element 12 which is configured to perform one or more operations with respect to the sample 16, including imaging the sample 16, analyzing the sample 16, magnifying the sample 16, and/or modifying the sample 16, such as by cutting or stretching the sample 16. In more specific illustrative examples, instrument 10 may be a camera, microscope, scanning electron microscope, mass spectrometer, x-ray fluorescence analyzer, laser ablation apparatus, or other apparatus. Various samples 16 of different types or forms may be processed including, for example, solids, deformable samples (e.g., tissues), particulates, powders, and liquids.

As shown, instrument 10 includes a support member 14 which is configured to support and position the sample 16 relative to the processing element 12 during processing. Sample 16 may be directly supported by support member 14, or the sample 16 may be provided upon a sample holder (e.g., shown in FIG. 10) which is placed upon support member 14. In some implementations such as multi-modal analysis, a plurality of different instruments 10 may be used and the sample 16 may be transferred between different instruments 10 at different moments in time. The support member 14 may include the ability to manipulate the sample 16 or position it for subsequent operations.

Instrument 10 may also include an appropriate computing device 11 which is configured to control and implement processing operations with respect to samples 16. In the example embodiment, computing device 11 includes a user interface 13, processing circuitry 15 and storage circuitry 17.

User interface 13 is configured to interact with an operator including conveying data to a user, such as saved images of the sample acquired with alternate modalities or real-time images of the sample, as well as receiving inputs from the user, for example, including commands which control operations of the instrument to process information about the sample or to effect instrumental analysis operations.

Processing circuitry 15 is arranged to process data (e.g., perform recognition and identification of unique markers 22, perform operations to locate targets using locations of markers, perform transformation operations, perform reconstruction operations, etc.), control data access and storage, issue commands, and control other desired operations of instrument 10. Processing circuitry 15 may comprise circuitry configured to implement desired programming provided by appropriate computer-readable storage media in at least one embodiment. For example, the processing circuitry 15 may be implemented as one or more processor(s) and/or other structure configured to execute executable instructions including, for example, software and/or firmware instructions. Other exemplary embodiments of processing circuitry 15 include hardware logic, PGA, FPGA, ASIC, state machines, and/or other structures alone or in combination with one or more processor(s). These examples of processing circuitry 15 are for illustration and other configurations are possible.

Storage circuitry 17 is configured to store programming such as executable code or instructions (e.g., software and/or firmware), electronic data, databases, image data, or other digital information and may include computer-readable storage media. In one embodiment, storage circuitry 17 includes a database of locations of respective markers within the reference frames and unique identifiers of the markers as well as locations of targets within samples with respect to the markers which are associated with the samples as described in further detail below. At least some embodiments or aspects described herein may be implemented using programming stored within one or more computer-readable storage medium of storage circuitry 17 and configured to control appropriate processing circuitry 15.

The computer-readable storage medium may be embodied in one or more articles of manufacture which can contain, store, or maintain programming, data and/or digital information for use by or in connection with an instruction execution system including processing circuitry 15 in the exemplary embodiment. For example, exemplary computer-readable storage media may be non-transitory and include any one of physical media such as electronic, magnetic, optical, electromagnetic, infrared or semiconductor media. Some more specific examples of computer-readable storage media include, but are not limited to, a portable magnetic computer diskette, such as a floppy diskette, a zip disk, a hard drive, random access memory, read only memory, flash memory, cache memory, and/or other configurations capable of storing programming, data, or other digital information.

Figure 2:
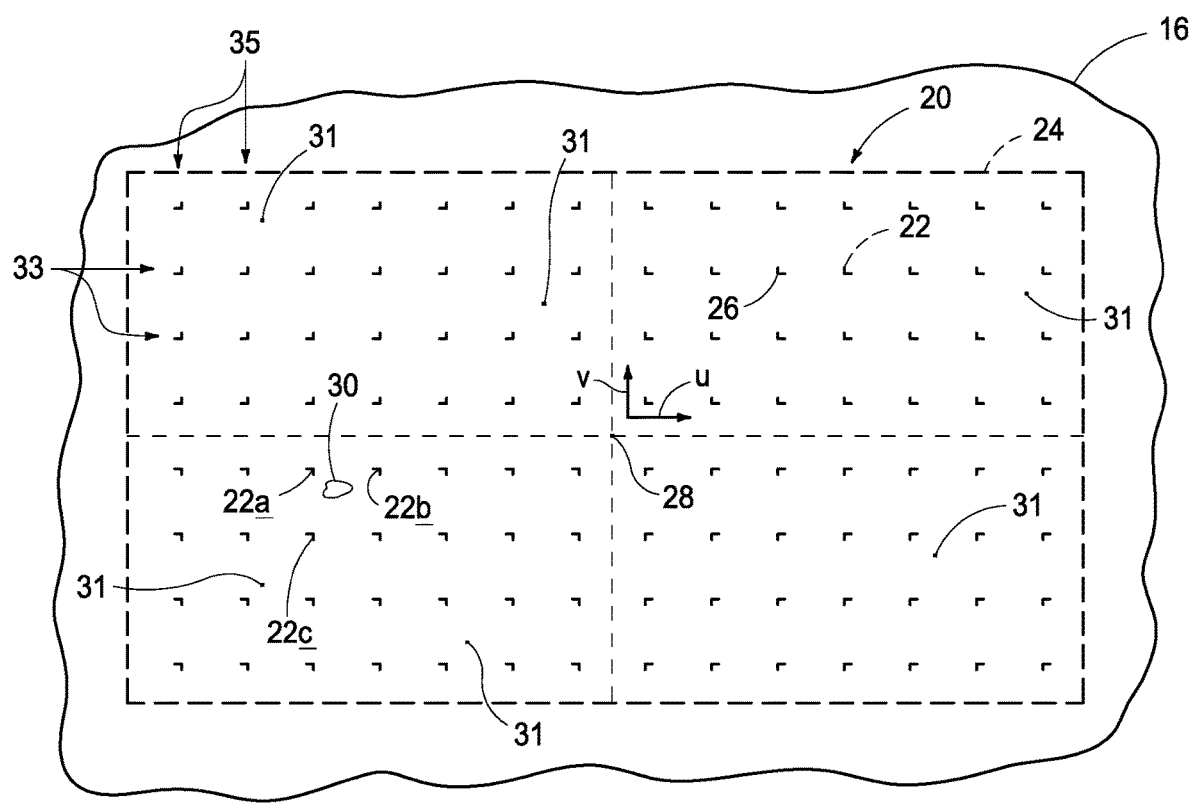
FIG. 2 is an illustrative representation of a reference frame which includes a plurality of markers according to one embodiment.

Referring to FIG. 2, a reference frame 20 which is associated with a sample 16 is shown according to one embodiment. The reference frame 20 includes a two-dimensional arrangement of a plurality of markers 22 which are associated with sample 16 in some embodiments. The illustrated rectangular reference frame 20 itself is not associated with the sample 16 in example embodiments described below, but rather reference frame 20 refers to the collection and arrangement of markers 20 with respect to one another and which are associated with sample 16 as discussed below. The reference frame 20 is shown associated with a single monolithic contiguous sample 16 in the example of FIG. 2 although the reference frame 20 may also be associated with a plurality of samples 16 or separate pieces of a single sample 16 (for example upon a slide) in other embodiments. Reference frame 20 includes a plurality of markers 22 which are uniquely identifiable from one another and are arranged in a predefined pattern (i.e., before association of the reference frame 20 and markers 16 with a sample) in one embodiment. The example reference frame 20 shown in FIG. 2 includes the markers 22 arranged in an array or grid although markers 22 may be arranged in other patterns in other embodiments. The reference frame 20 may work at optical length scales in some embodiments and may be read by the human eye and/or a computing device, for example by processing images of the reference frame 20 and markers 22 associated with the sample 16.

The system for marking conformation and spacing is extensible. In one embodiment, the reference frame 20 may cover at least substantially an entirety of a standard glass microscope slide. In this example, the markers 22 define a reference frame 20 that is approximately 4 cm by 2 cm in dimension with the markers 22 spaced at approximately 800-1000 μm. In other embodiments, the reference frame 20 could be extended to an arbitrary size. The marker 22 spacing could define a reference frame 20 that was 100 m by 50 m, simply be changing the marker 22 size and spacing. In addition, the effective resolution is intended to define both the marker 22 number and size in some arrangements, with more smaller markers used to provide arbitrary spatial coverage at nominal resolution in some embodiments.

The reference frame 20 having the markers 22 arranged in the predefined pattern is associated with the sample 16 to be processed, for example, before any modifications to the sample 16 in one embodiment. In one example embodiment, the reference frame 20 including markers 22 is impressed into sample 16 thereby forming indentations in the sample 16 (e.g., in the form of a soft deformable sample in one example) corresponding to the markers 22 which operates to associate the reference frame 20 and markers 22 with sample 16. In another example, the markers 22 may be painted or otherwise applied to a surface of the sample 16 or a sample holder thereby forming raised features corresponding to the markers 22. Reference frame 20 may be associated with samples 16, including different types of samples, in different ways in other implementations described below.

The association of reference frame 20 and markers 22 with sample 16 operates to create a virtual coordinate system of the sample 16 itself and which is independent of other coordinate systems, such as those of the instruments 10. In some embodiments, the association of the markers 22 with respective locations of the sample 16 is permanent (corresponding to virtual self-defining coordinates) and does not change after the association, while the physical locations of the markers 22 with respect to other markers 22 may change after the association due to deformities or other changes to the sample 16, such as shrinkage. Following the association, the markers 22 may be used to perform various operations with respect to processing of the sample 16 including registration, reconstruction, and rectification in some examples.

More specifically, the reference frame 20 and markers 22 are associated with samples 16 which are as close as possible to being in their initial conditions prior to changes to the samples in some embodiments. Thereafter, the markers 22 may be used to perform various operations with respect to the samples 16 after the samples 16 have changed (e.g., by deformation, shrinkage, stretching, mutilation, etc.) including returning the sample 16 to initial physical or image form by performing one or more of registration, reconstruction, and rectification of images of the sample using the above-described computing device of the instrument.

As described in illustrative embodiments below, the markers 22 may individually include a unique arrangement of components or features which enable a given marker 22 to be uniquely identified from other markers 22. In one embodiment, it is desired to size the reference frame 20 to cover at least substantially the entirety of the sample 16 or at least areas of interest within the sample 16. To provide extensibility and scalability, reference frames 20 of different sizes and dimensions may be used depending upon the samples 16 being processed, and different numbers of markers 22 (e.g., hundreds or thousands) may be used in different reference frames 20 in different embodiments.

The markers 22 in the depicted reference frame 20 are included in a plurality of sub-areas 24. The markers 22 may be configured to individually indicate which specific sub-area 24 they reside in as discussed further below with respect to the example marker 22 shown in FIG. 4.

In addition, the markers 22 may also individually indicate their respective orientations within the reference frame 20 in one embodiment. For example, the markers 22 shown in FIG. 2 are in the form of "Ls" and the vertices 26 of the markers 22 point to a center 28 of the reference frame 22 which indicate the orientation of the respective individual markers 22 relative to reference frame 20 and the sample 16 once the reference frame 20 is associated with the sample 16. In one embodiment, the center 28 of the reference frame 20 is coarsely collated with the center of the sample 16 during the association of the reference frame 20 with the sample 16. However, since the virtual coordinate system of the marking system is self-referential, the center of the reference frame 20 need not coincide with the center of the sample 16.

The reference frame 20 and associated markers 22 are associated with samples 16 for a variety of purposes which are facilitated by the virtual coordinate systems of the samples 16 which result from association of the reference frames 20 and markers 22 with the samples 16 and which correspond to the samples 16 themselves.

In one example implementation, the markers 22 may be utilized to locate a target or object of interest 30 in the sample 16, including microscopic targets of interest. The positions of the targets 30 may be determined and stored with respect to the virtual coordinate system of the sample 16 which is defined by the reference frame 20 which is associated with the sample 16 itself. In one example implementation after the reference frame 20 and markers 22 have been associated with the sample 16, the sample 16 is observed using a microscope, and target 30 is identified which may be desired to be subsequently located, perhaps using a different instrument than the one used to identify the target 30 and its location. In one illustrative example, sample 16 may be a tissue of an organism and target 30 is an irregularity within the sample 16.

In one embodiment, one or more markers 22 (which are closest to the target 30 in some examples) are used to identify the specific location of the target 30 within the sample 16 after the target 30 has been identified. In the example of FIG. 2, a plurality of markers 22a, 22b, 22c which are immediately adjacent to the target 30 are identified and associated with the specific target 30. For example, information regarding the location of the target 30 relative to markers 22a, 22b 22c may be stored within a database for the sample 16. In one example embodiment, triangulation may be used to specify the location of the target 30 using markers 22a, 22b, 22c. Thereafter, when it is desired to locate the target 30 within the sample 16, perhaps using a different instrument, the information indicating the location of the target 30 relative to the reference frame 20 is retrieved and used to locate the target 30 within the sample 16. The location information is used to spatially orient the instrument to conduct analysis of desired targets and areas of the sample being analyzed in one embodiment.

The above-describe example uses markers 22a, 22b, 22c that are nearest the target 30, however, the location of the target 30 is stored in virtual coordinates in some embodiments, which apply to all of the markers 22 in the reference frame 20, and any of the markers 22 within the reference frame 20 may be used to locate the target 30 using the virtual coordinates.

In the described example, the stored information identifies the location of the target 30 of interest being within the area defined by markers 22*a*, 22*b* 22*c*. The markers 22*a*, 22*b*, 22*c* are then located and identified within the sample 16 and used to provide information regarding locations of the sample 16 corresponding to the markers 22*a*, 22*b*, 22*c* using the stored information regarding the markers 22*a*, 22*b*, 22*c* and their locations upon the sample 16. The located and identified markers 22*a*, 22*b*, 22*c* may be used to locate the target 30 (i.e., the defined area between markers 22*a*, 22*b* 22*c* may be searched to locate the target 30) in one embodiment.

In some arrangements, the subsequently used instrument may not have sufficient resolution to locate relatively small targets (e.g., targets 30 are smaller than the markers 22), however, the applicable markers may be able to be located in the sample (e.g., by human operator and/or computer processing of images of the sample) and then used to locate the target in the sample using the stored location or distance information of the target of interest relative to the markers. In one embodiment, the computing device of an applicable instrument is able to access a database of known targets of interest within the sample being processed with respect to markers of the reference frame and the locations of the individual markers in the reference frame. The computing device controls the instrument to locate the targets using respective markers 22 of the reference frame 20 and the information of the targets 30 stored within the database.

Accordingly, in one embodiment, the reference frame 20 and markers 22 may be used to perform registration operations, including using the previously generated and stored information regarding a sample to locate targets of interest within the sample using one instrument or a plurality of different instruments. In particular, it may be difficult to locate targets using instruments of different magnification, and the reference frame 20, markers 22 and stored information regarding the targets of interest may be used to register the sample with respect to the instruments including locating targets of interest within sample 16 using the different instruments.

The example of the target 30 in FIG. 2 is illustrative and larger or smaller targets may also be identified and the respective locations thereof with respect to one or more markers 22 may be stored within a database for the respective sample 16.

The reference frame 20 and markers 22 may be used to perform reconstruction operations in another example implementation of use. For example, the reference frame 20 and markers 22 may be associated with a sample 16 during an initial state of the sample 16 prior to deformations, modifications or changes to the sample (e.g., tears, rips, shrinkage, etc.) and information regarding one or more identified targets of the sample 16 relative to one or more markers 22 may be stored for later use. Thereafter, the sample 16 may change and the reference frame 20 and markers 22 may be used to digitally process images of the changed sample to reconstruct the sample to its initial state prior to the change.

In one embodiment, non-linear transformation may be performed using the markers 22 to reconstruct images of the sample 16 in its present state to create an image of the sample 16 in its initial state, for example by registering it to an ideal virtual sample. Similarly, the reference frame 20 and markers 22 may also be used to perform rectification operations which may include using non-linear transformation to remove warp within images of the sample 16, for example, at the corners of the sample 16, and to provide images of the sample 16 in the initial state with the reference frame 20 and markers 22.

As discussed above, the markers 22 are arranged within a grid in one embodiment of the reference frame 16. The grid has plural orthogonal virtual U, V axes and corresponding horizontal rows 33 and vertical columns 35 within the reference frame 20 in one embodiment. Markers 22 are arranged at intersections of the rows 33 and columns 35 of the grid in one embodiment. Spacing of the rows 33 from one another and the spacing of columns 35 from one another are constant in one example, but may be varied in different configurations of the reference frame.

In addition, the markers 22 may be identified using a grid coordinate system in one embodiment where each marker 22 has a fixed virtual location (within the reference frame 20 and relative to other markers 22) corresponding to a respective one of a plurality of individual UV coordinates. In particular, while the physical spacing between markers 22 which are associated with the sample 16 may change over time (e.g., due to changes in the sample 16 itself), the virtual distance between adjacent markers 22 is constant in one embodiment and may be used to perform non-linear processing of images of the sample 16 for reconstruction of the sample 16 in one embodiment.

Different coordinate systems may be used in different examples. In one arrangement, U, V coordinates represent the rows 33 and columns 35 of the markers 22 in the grid. In one more specific embodiment, UV coordinate 0, 0 corresponds to the marker 22 positioned in the upper right sub-area that is closest to the center 28. Referring to FIG. 2, the markers in the lowest row of the upper right sub-area 24 may then be identified with UV coordinates (0,0); (1,0); (2,0) and so on from center 28 and progressing from the left to the right, while the markers in the leftmost column of the upper right sub-area 24 may be identified with coordinates (0,0); (0,1); (0,2) and so on from the center to the top. This convention may be used for the remaining markers 22 in the upper right sub-area 24.

For the remaining sub-areas 24 of reference frame 20, negative numbers may be used to indicate the respective columns 35 of markers 22 to the left of the center 28 and the respective rows 33 of markers 22 below the center 28 in one embodiment. For example, the markers 22 closest to the center in the upper left, lower left and lower right sub-areas 24 have the coordinates (−1,0), (−1,−1), and (0,−1), respectively. This example convention is similar to the usual Cartesian coordinate system and other coordinate systems may be used in other embodiments.

As shown in FIG. 2, the reference frame 20 also includes a plurality of dots 31 according to one embodiment. The dots 31 are randomly positioned between different markers 22 in the illustrated embodiment and some embodiments may include numerous additional dots 31. Dots 31 are provided in one implementation for added redundancy which may be used by a human operator to aid in location and registration. For example, if one or more markers 22 are damaged or missing, the locations of the dots 31 relative to the markers 22 are accessed from a database which includes information regarding reference frame 20 (e.g., including information regarding locations of markers 22 and dots 31) and may be useful in identifying individual markers 22 in these situations. For example, if a given marker 22 itself is not entirely uniquely identifiable, the presence of a dot 31 nearby may aid with the identification of the individual marker 22. Dots 31 are not uniquely identifiable by themselves and have a fixed size relative to the rest of the reference frame 20 in one embodiment.

In some embodiments, the orientation of the reference frame 20 has no relation to sample placement or orientation. In other embodiments, for example as shown in FIG. 3, the center of the reference frame 20 is coarsely collocated with the center of the sample as mentioned above, and the reference frame 20 may be aligned within a few degrees of one or more edges of the sample.

Figure 3:
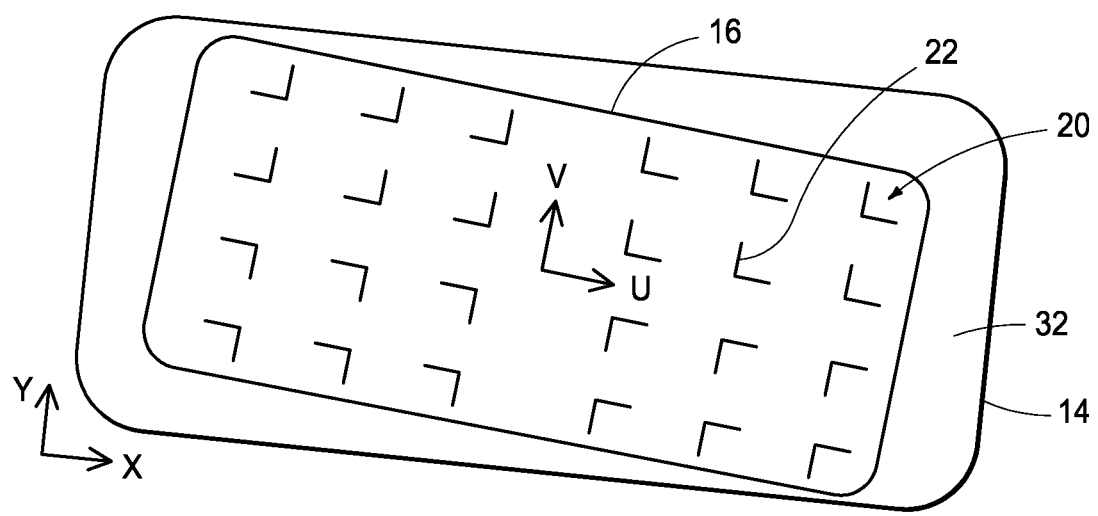
FIG. 3 is an illustrative representation of a virtual coordinate system of a reference frame according to one embodiment.

FIG. 3 is an illustrative top view of a sample 16 which is shown upon a receiving area 32 of the support member 14 of instrument 10 in one embodiment. The sample 16 has an associated reference frame 20 and a plurality of markers 22 providing a virtual U, V coordinate system in the illustrated example. The virtual coordinate system may be referred to as a coordinate system of the sample 16 after the reference frame 20 and markers 22 are associated with the sample 16. Targets 30 within the sample 16 may be identified and their locations within the sample 16 are specified with respect to the virtual coordinate system provided by reference frame 20 and markers 22 in one embodiment. Targets 30 may thereafter be located within the sample 16 using the virtual coordinate system which is associated with the sample 16 itself regardless of changes in coordinate translation, coordinate rotation, or deformation or fragmentation of the sample holder or sample as the virtual coordinate system provided by the reference frame 20 and markers 22 associated with the sample 16 is non-rigid. Images of samples 16 having the associated reference frame 20 and virtual coordinate system may be reassembled digitally in one embodiment.

In addition, the instrument may include its own X, Y coordinate system which corresponds to the support member 14 in one embodiment. As shown, the sample 16 may be positioned in any appropriate manner upon the receiving area 32 and the U, V coordinate system of the sample need not be aligned with the X, Y coordinate system of the instrument.

Figure 4:
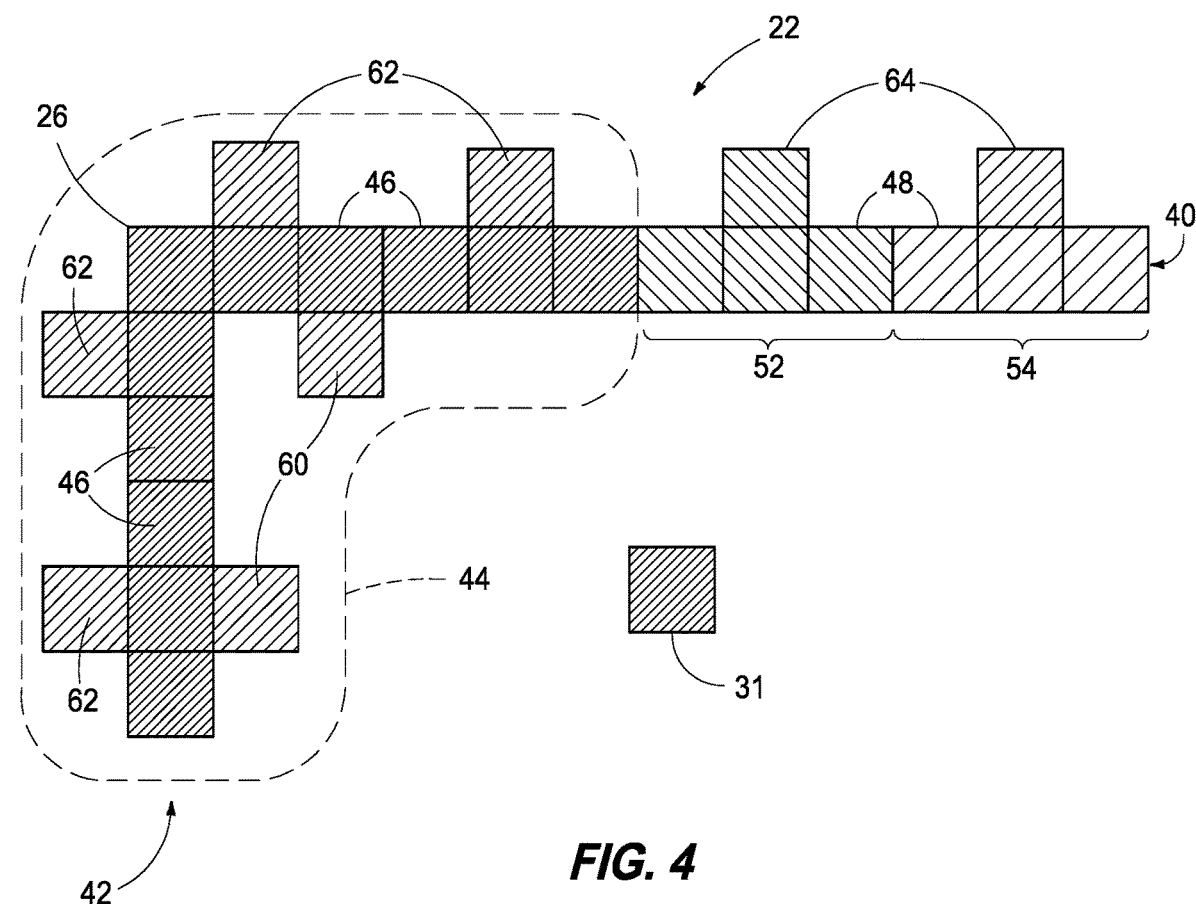
FIG. 4 is an illustrative representation of a marker of a reference frame according to one embodiment.

As mentioned above, individual markers 22 and their locations in the reference frame 20 may be uniquely identifiable using a coordinate system in one embodiment. Referring to FIG. 4, the configurations of the markers 22 themselves may also operate to uniquely identify the markers 22. As shown, the markers 22 individually have a configuration in the form of an "L" shape with a horizontal leg 40 meeting a vertical leg 42 at the vertex 26 of the individual marker 22. The horizontal leg 40 and vertical leg 42 are aligned with a respective column and a row of the reference frame 20 in one embodiment.

The markers 22 have unique shapes or outlines which allow the markers 22 to be individually identifiable from the others based upon their shapes or outlines and which further identify their locations within the reference frame 20 itself in some embodiments. Additional details regarding individual markers 22 are described in illustrative examples below where different markers 22 include different arrangements and/or numbers of components including blocks and flags providing the unique shapes or outlines of the markers 22 and which permit them and their locations in the frame 20 to be uniquely identified in one embodiment.

In the example of FIG. 4, each marker 22 of the reference frame 20 has at least a base form 44 where each of the legs 40, 42 includes six base components in the form of base blocks 46 in the depicted arrangement (i.e., legs 40, 42 share block 46 which is the vertex 26 of the illustrated marker 22). The base form 44 for some of the markers 22 also includes one or more interior flags 60 and one or more exterior flags 62 (i.e., the interior and exterior flags 60, 62 are conditional) which are discussed further below. Some of the markers 22 of the reference frame 20 also include additional extension components in one or more extension sets 52, 54. In one embodiment, these extension sets 52, 54 include extension blocks 48 and may additionally include one or more extension flags 64 as discussed in additional detail below.

In one embodiment of reference frame 20 mentioned above, each marker 22 has a unique arrangement or configuration of the above-mentioned components including flags 60, 62, 64 providing unique shapes and outlines for the markers 22 and which enable the individual markers 22 to be uniquely identified by a human operator or computer from the other markers in one embodiment. For example, a computer may be given information of the outlines or shapes of the markers 22 to be located and the computer may search images of the sample 16 for the presence of one or more of the markers 22 associated with the sample 16. In addition, as discussed below, the presence or absence of flags at predefined locations of the individual markers 22 may indicate the locations of the markers 22 in different sub-areas 24 and/or at different locations within a single sub-area 24 in one embodiment.

In one more specific embodiment, the markers 22 positioned near the center 28 of the reference frame 20 may have the base form 44 of FIG. 4 including six base blocks 46 in each leg 40, 42. For example, referring to FIG. 5, a portion of a reference frame 20 is shown including four markers 22 which have the base form and are adjacent to center 28 of reference frame 20.

As discussed herein in one embodiment, the shapes or outlines of the markers 22 are configured to indicate their respective locations in the reference frame 20. The interior flags 60 are used to indicate which of the plurality of sub-areas 24 the respective markers 22 are located within in one embodiment. For example, the use and arrangement (as well as non-use) of interior flags 60 with the markers 22 corresponds to a coding scheme consisting of paired binary values in one embodiment which operates to identify the locations of the markers 22 in respective sub-areas 24 of the reference frame 20 in the presently described embodiment. For example, the presence or absence of interior flags 60 at predefined locations of an individual marker 22 corresponds to a binary coding scheme which indicates the location of the marker 22 in one of the sub-areas 24.

In the described example virtual coordinate system, the interior flags thus denote sign. As mentioned above, virtual coordinates progress away from the center 28 in positive increments in both U and V directions in the upper right sub-area 24 while virtual coordinates progress away from the center 28 in negative increments in the lower left sub area 24. In this example, row and columns for the upper right sub-area 24 are represented by positive values, row and columns for the lower right sub-area 24 are represented by positive and negative values, respectively, row and columns for the upper left sub-area 24 are represented by negative and positive values, respectively, and row and columns for the lower left sub-area 24 are represented by negative values. The assignment of sign is illustrative in this example and different conventions may be used in other embodiments.

Figure 5:
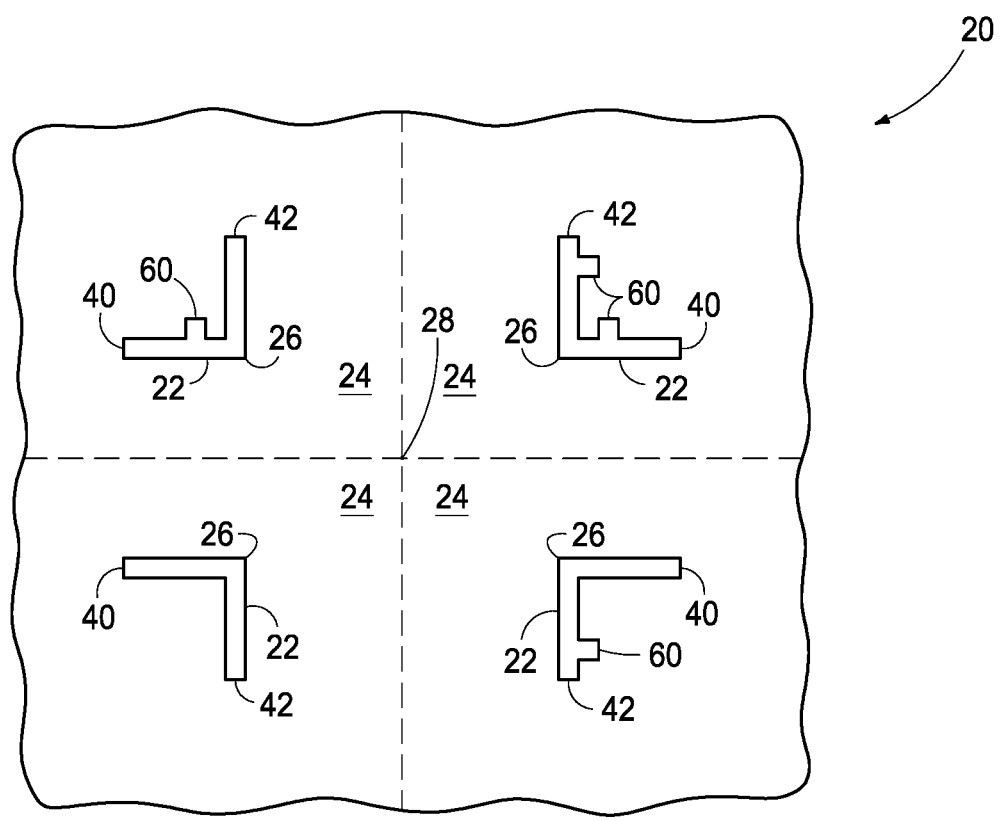
FIG. 5 is an illustrative representation of markers in a plurality of sub-areas of a reference frame according to one embodiment.

In the illustrated example of FIG. 5, the presence of an interior flag on one of the legs 40, 42 indicates positive values (or a binary 1) along the respective axes for the respective marker 22 while the absence of an interior flag on one of the legs 40, 42 indicates negative values (or a binary 0) along the respective axes for the respective marker 22. In FIG. 5, markers 22 with no interior flags 60 (binary 0, 0) indicate that the respective markers 22 reside in the lower left sub-area 24, markers 22 with only one interior flag 60 on the vertical leg 42 (binary 0, 1) indicate that the respective markers 22 reside in the lower right sub-area 24, markers 22 with interior flags 60 on both legs 40, 42 (binary 1, 1) indicate that the respective markers 22 reside in the upper right sub-area 24, and markers 22 with only one interior flag 60 on the horizontal leg 40 (binary 1, 0) indicate that the respective markers 22 reside in the upper left sub-area 24.

The assignment of sign is arbitrary, requiring only that four quadrants are defined for computation in this example embodiment. In addition, the reference frame 20 may be flipped or transposed about the U or V axes in some embodiments which yield alternate definable coordinate systems. For example, the reference frame 20 may be associated with either side of a clear sample and the markers 22 are transposed if associated with one side of the sample compared with the other.

The markers 22 may also include one or more exterior flags 62 and perhaps one or more extension sets 52, 54 and extension flags 64 which also operate to uniquely identify the individual markers 22 themselves as well as locations of the markers 22 in a given sub-area 24 in one embodiment. In particular, the use and arrangement (as well as non-use) of exterior flags 62 and extension flags 64 within the markers 22 corresponds to a numerical binary coding scheme which operates to identify the locations of the markers 22 within an individual sub-area 24 of the reference frame 20 in one embodiment. For example, the presence or absence of exterior flags 62 at predefined locations of the individual markers 22 may indicate the locations of the markers 22 within a single sub-area 24.

Figure 6:
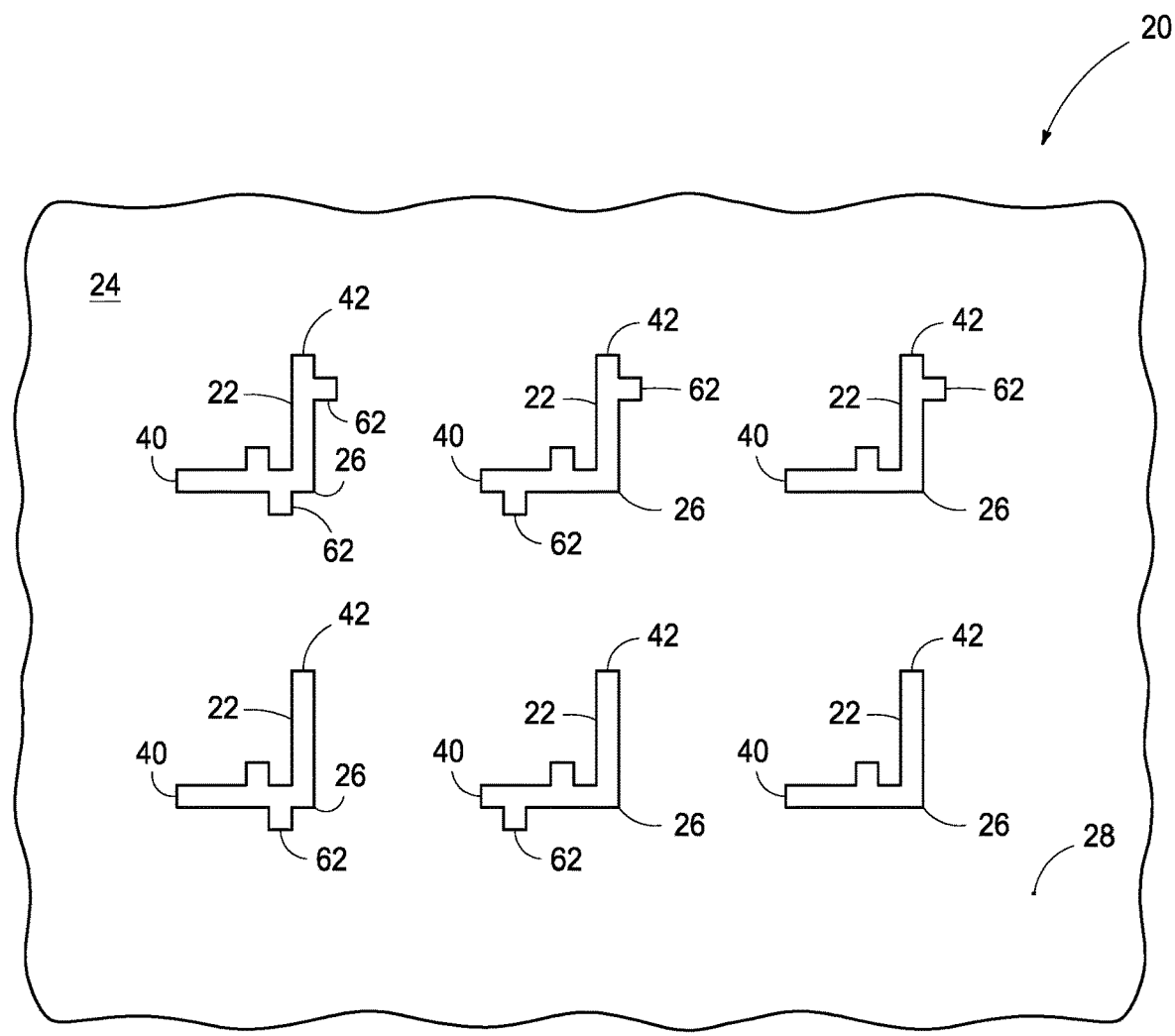
FIG. 6 is an illustrative representation of markers within a sub-area of a reference frame according to one embodiment.

Referring to FIG. 6, a portion of reference frame 20 is shown including a plurality of markers 22 within a single sub-area 24 (e.g., the sub-area 24 located in the upper left of the reference frame 20) with respect to center 28 and some of the markers 22 include one or more exterior flags 62. As mentioned above, the use and arrangement (and non-use) of exterior flags 62 corresponding to positive and negative values or binary values of 1 and 0, respectively, provide unique shapes and outlines of the markers 22 which enable the markers 22 to be uniquely identifiable from one another as well as correspond to respective binary values which indicate the locations of the markers 22 in sub-area 24 in the illustrated example.

In one more specific embodiment of a numerical binary coding scheme, the markers 22 may be arranged in a sequence within the reference frame 20 which is identified by the exterior and/or extension flags corresponding to the numerical binary coding scheme.

A plurality of exterior flags 62 (and extension sets 52, 54 and extension flags 64 for some markers 22) on horizontal legs 40 of the markers 22 identify the locations of the markers 22 in a given row while the exterior flags 62 (and extension sets 52, 54 and extension flags 64) on vertical legs 42 identify the locations of the markers 22 in a given column.

In particular, referring to the lowest row of markers 22 of FIG. 6, the marker 22 adjacent to the center 28 of the reference frame 20 has no exterior flags which indicates its position in the first column and first row of the sub-area 24 which is adjacent to the center 28 and corresponds to binary value 00. The next marker 22 to the left in the same row has a single exterior flag 62 on leg 40 located spaced from the vertex 26 indicating its location in the second column from the center 28 in the example depicted coding arrangement and corresponding to binary value 01. The next marker 22 to the left in the same row has a single exterior flag 62 located close to the vertex 26 of the respective marker 22 indicating its location in the third column from the center 28 in the example depicted coding arrangement and corresponding to binary value 10. Although not shown, the next marker 22 to the left in the same row (i.e., in the fourth column from the center 28 of the bottom row) may include two exterior flags 62 which are positioned in the predefined positions close to and farther from the vertex 26 of the respective marker 22 which operate to indicate its location in the fourth column from the center 28 in the example depicted embodiment and corresponding to binary value 11. It is understood that the positioning of the exterior flags 62 is arbitrary, and a different coding scheme may be used, for example, shown in FIG. 7 where a marker 22 in the first position includes a flag 62 closer to the vertex as opposed to farther away from the vertex as discussed in the example of FIG. 6.

Additional markers 22 in the same row may be identified using extension flags 64 of extension sets 52, 54 which may correspond to additional binary values in one embodiment. Referring again to FIG. 4, and as mentioned previously, some of the markers 22 of a reference frame 22 may include one or more extension sets 52, 54. In one embodiment discussed above, four markers 22 may be individually identified in a row using the exterior flags 62 of the base form 44. However, in some embodiments, it may be desired to have more than four markers 22 in a row of a given sub-area 24, and the extension sets 52, 54 are used to enable additional markers 22 to be uniquely identified.

For example, as shown in the example of FIG. 4, each leg 40, 42 of the base form 44 includes two locations for exterior flags 62. In a binary coding scheme, this arrangement permits four markers 22 to be uniquely identified within a given row or column of a sub-area 24. However, additional markers 22 may also be present within the row or column of the sub-area 24 and the use of extension sets 52, 54 permits the additional markers to be uniquely identified.

The two exterior flags 62 on the horizontal leg 40 of the base form 44 permit four markers 22 to be uniquely identified in a row in the embodiment described above. The extension sets 52, 54 individually including extension blocks 48 and a single extension flag 64 permit additional markers 22 in a given row of a sub-area 24 to be uniquely identified with corresponding binary values based upon the flags 62, 64. Although two extension sets 52, 54 are shown in the example of FIG. 4, additional extension sets may also be used to uniquely identify additional markers 22. Furthermore, the illustrated examples show extension sets 52, 54 with respect to the horizontal leg 40, but extension sets may also be used with the vertical leg 42 to uniquely identify additional markers 22 within a given column.

With respect to a given row, the use of the first extension set 52 on leg 40 provides three different possible exterior flags 62, 64 which may be used to uniquely represent eight additional markers 22 (in addition to the four markers 22 which do not include extension sets 52, 54). In one particular embodiment, a marker in a fifth column from the center 28 may be uniquely identified by the presence of extension blocks 48 of the first set 52 without the extension flag 64 thereof (in combination with no exterior flags 62). A marker 22 in a sixth column from the center 28 may be uniquely identified by the presence of extension blocks 48 of the first set 52 and also the extension flag 64 of the first set 52. The next marker 22 may be uniquely identified by the inclusion of one exterior flag 62, extension blocks 48 of the first set 52 and no extension flags 64. This may be repeated according to the binary coding scheme until all the different binary combinations of two exterior flags 62 and the single extension flag 64 are utilized. Thereafter, the second extension set 54 may be used to uniquely identify sixteen additional markers 22 father from the center 28 in the same row in the same manner as discussed above.

The exterior flags 62 also indicate the locations of markers 22 in different rows of a given sub-area 24 in the illustrated example embodiment. In addition, binary values may be similarly associated with markers 22 in different rows in one embodiment and the combined binary values for the row and columns of the markers 22 identify the row and column locations of the markers 22 in the sub-area 24. The presence of a flag corresponds to a positive value or binary 1 while the absence of a flag corresponds to a negative value or binary 0.

Referring again to FIG. 6, the marker 22 closest to center 28 resides in the first row and first column adjacent to the center 28 and has no exterior flags corresponding to binary value 00 (and UV coordinate −1,0 using the example convention described above with respect to FIG. 2). The next marker 22 above in the second row and the same column includes a single exterior flag 62 at a location removed from the vertex 26 which indicates the location of the marker 22 in the second row corresponding to binary value 01. Although not shown, the next marker above in the same column includes a single exterior flag 62 at a location closer to the vertex 26 which indicates the location of the marker in the third row corresponding to binary value 10. Furthermore, the next marker above in the same column includes two exterior flags 62 at the locations closer to and farther away from the vertex 26 which indicate the location of the marker in the fourth row corresponding to binary value 11.

Accordingly, in one embodiment, the exterior flags 62, extension sets 52, 54, and extension flags 64 of legs 40, 42 and the corresponding binary values of the markers 22 within the different rows and columns may be used to identify the markers 22 themselves and the locations (e.g., respective rows and columns of the reference frame 20) in which the respective markers 22 reside. In the example described embodiment, the exterior flags 62, 64 and extension sets 52, 54 positioned along the horizontal leg 40 of the markers 22 indicate the locations of the markers 22 in different columns of the sub-area 24 and the exterior flags 62, 64 and extension sets 52, 54 positioned along the vertical leg 42 of the markers 22 indicate the locations of the markers 22 in different rows of the sub-area 24.

Figure 6A:
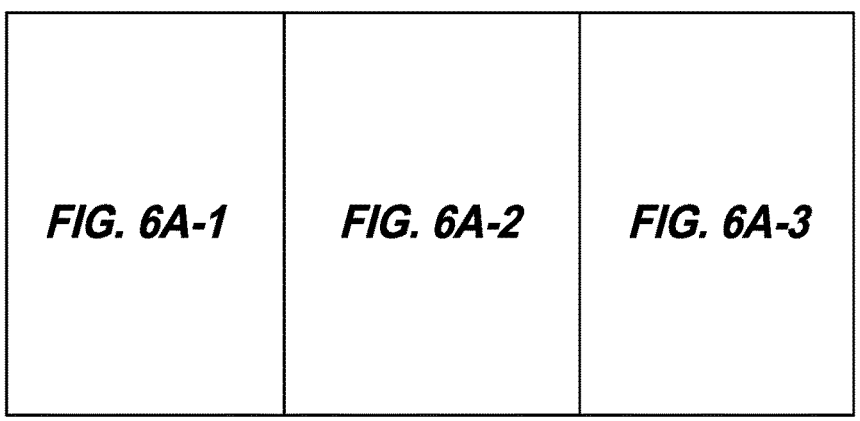
FIG. 6A is a map showing how to assemble FIGS. 6A1-6A3.
Figures 1, 6A:
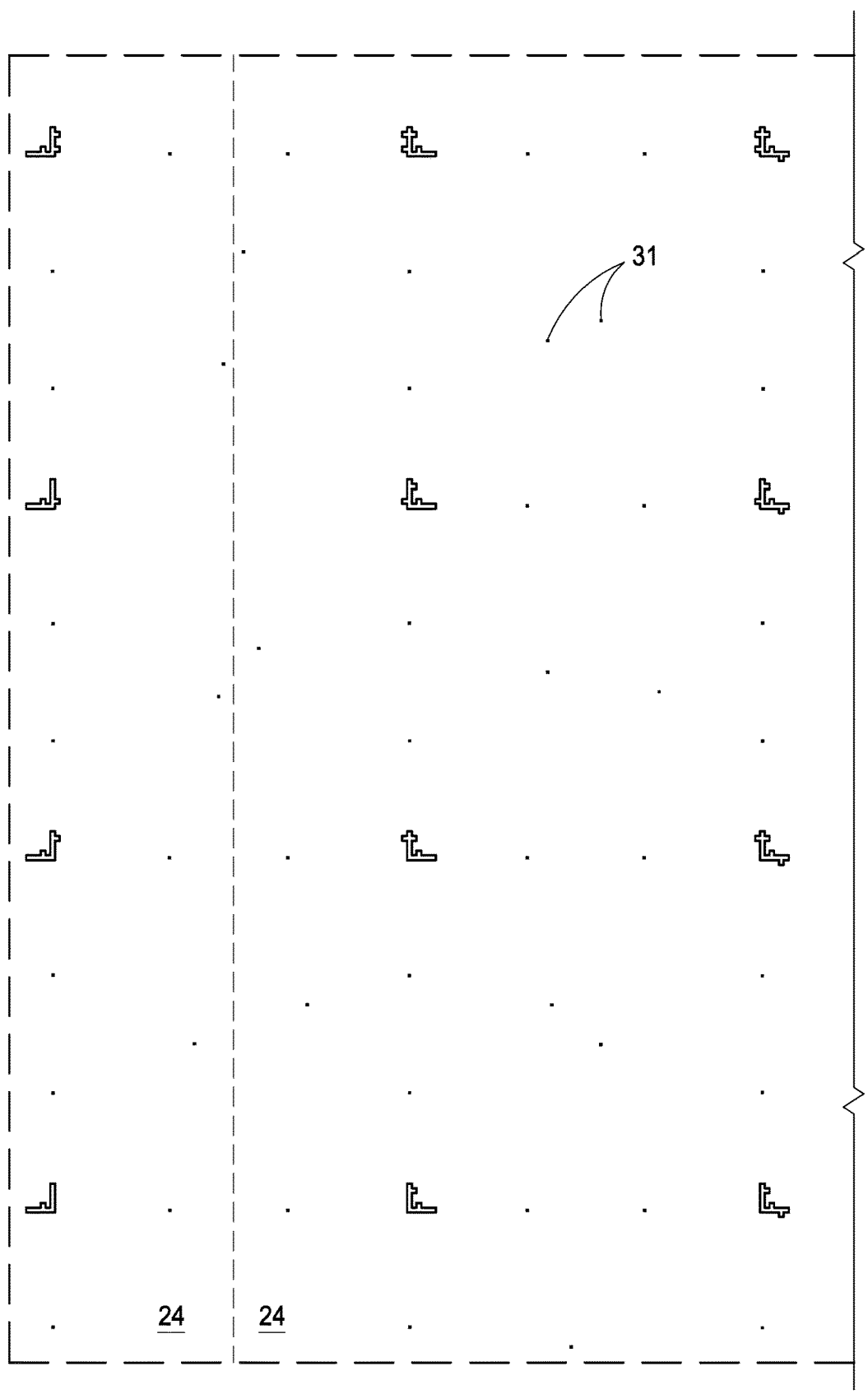
Figures 2, 6A:
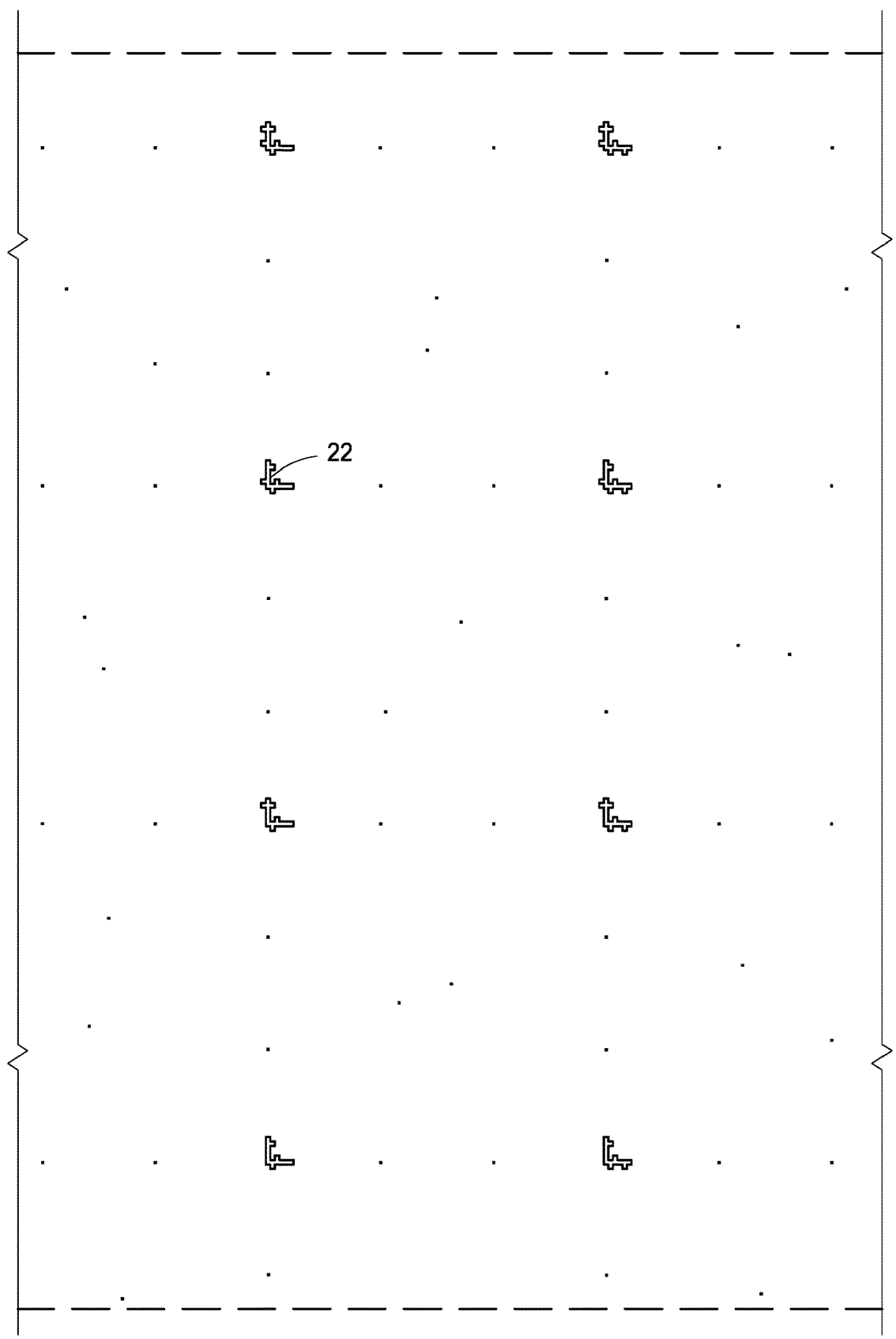
Figures 3, 6A:
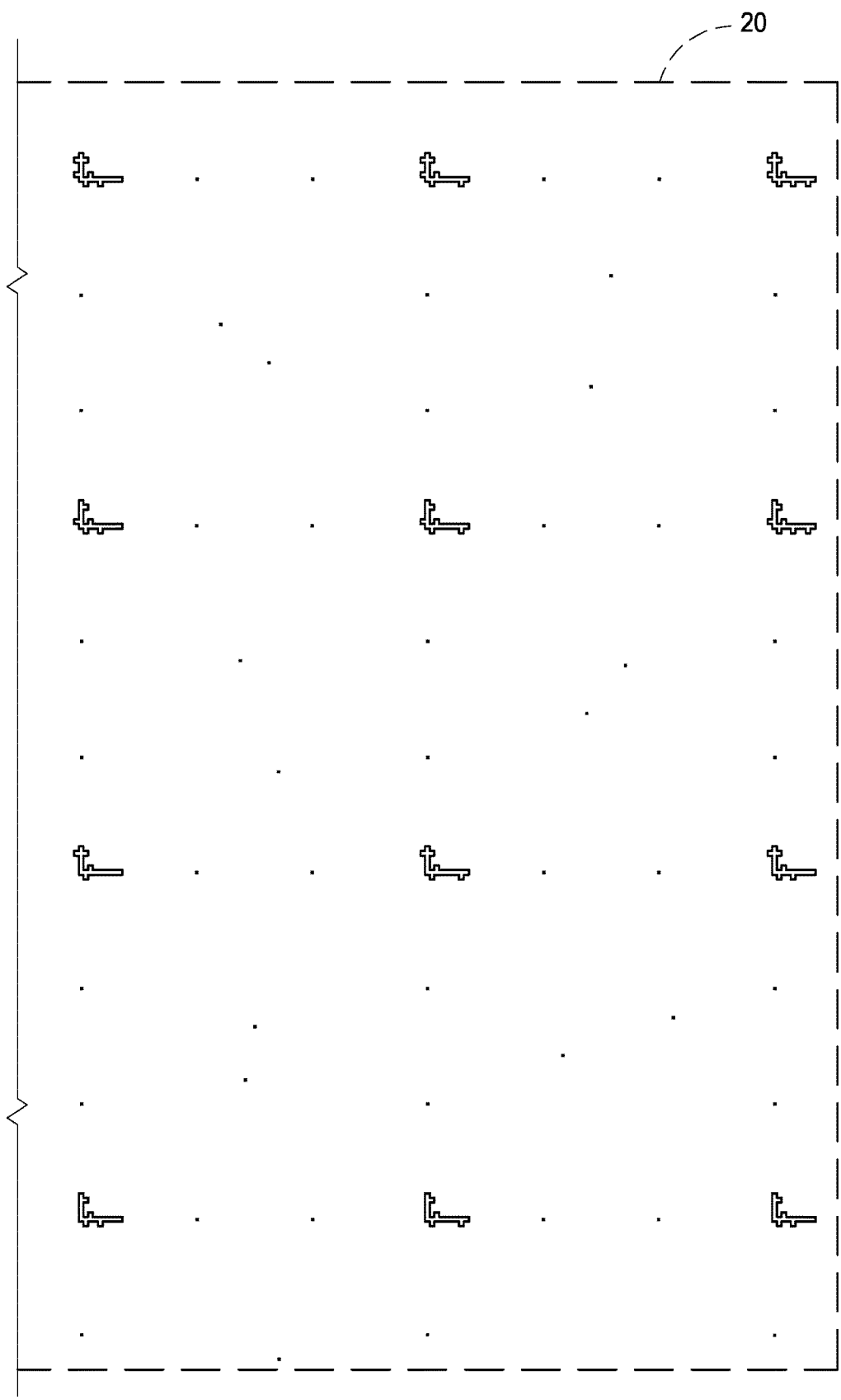

In one embodiment, the markers 22 are arranged in a sequence or progression in the reference frame 20 corresponding to row and columns described above. Additional markers 22 arranged according to a sequence are shown in FIG. 6A. The sequence starts at center 28 and progresses outward from the center 28 through the markers 22 in the first row closest to the center 28, and then progresses in the upper right sub-area 24 through the markers 22 in the next row and so on. Accordingly, the identification of a unique marker 22 within the sample 16 and its unique features may be used to identify the location of the marker 22 with respect to the sample 16 using the sequence of markers 22 of the respective sub-area 24 of the reference frame 20 associated with the sample 16. For example, the identified marker 22 may provide general guidance of where to search within the sample 16 to find a target of interest.

Referring to FIG. 7, additional details of an example arrangement of markers 22 in a sequence in the reference frame are shown in one embodiment. FIG. 7 indicates positions, binary values and flags which may be used for the markers in one arrangement. In this illustrated example, twenty-two markers 22 (positions 0-21 and binary values 0000-0101 where I is implied by block increment) and corresponding locations of exterior flags 62 and extension flags 64 upon leg 40 are shown. The leg 40 may include a plurality of blocks which each include three pixels in one embodiment (four blocks are shown in the example FIG. 7). The exterior flags 62 extend from the second and fifth pixels of the first and second blocks while the extension flags 64 extend from the eighth and eleventh pixels of the third and fourth blocks in the illustrated example. The same sequence system may also be used on vertical leg 42 of markers 22 to indicate locations of markers 22 in different rows of the reference frame 20 in one embodiment.

Figure 8:
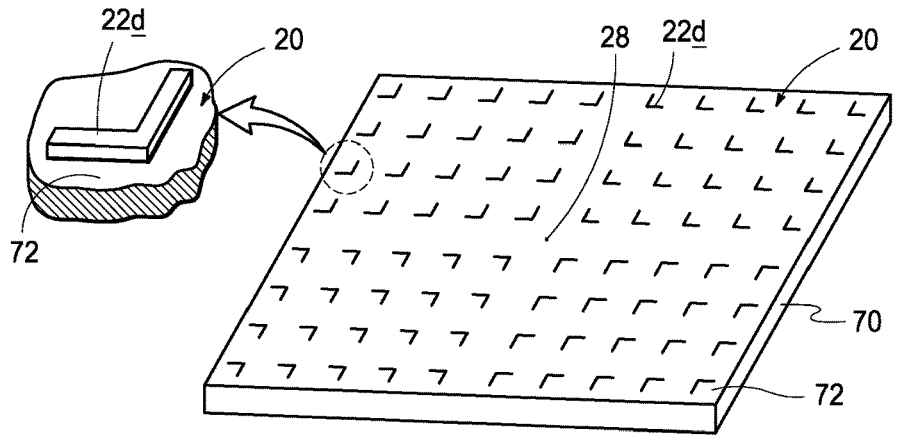
FIG. 8 is an illustrative representation of a stamp according to one embodiment.

Referring to FIG. 8, an example of a stamp 70 is shown which may be used to associate the reference frame 20 with a sample according to one embodiment. Although the sample is not shown in FIG. 8, the stamp 70 typically is sized to cover substantially an entirety of the sample to which the reference frame 20 will be associated.

In one embodiment, stamp 70 is formed by patterning a silicon wafer, for example, using photolithography. A single wafer may be used to form more than one stamp 70 which may or may not have the same reference frames. Different masks may be used to pattern the wafers to form reference frames of different sizes and different numbers and arrangements of markers in one embodiment.

The example stamp 70 shown includes an upper surface 72 and markers 22d are arranged in a pattern similar to the pattern shown in the example embodiment of FIG. 2. Upper surface 72 is substantially planar and markers 22d are protrusions which extend elevationally upwardly and outwardly of surface 72 in the depicted embodiment. As mentioned above, stamp 70 and markers 22d may be formed by patterning a silicon wafer in one embodiment. Markers 22d in the form of protrusions may be formed using other methods, such as printing (e.g., dot matrix) or painting upper surface 72 to form markers 22d, in other embodiments. Markers 22d in the form of paint may be transferred from surface 72 to a surface of the sample 16 (e.g., without forming indentations into the sample 16) to associate the reference frame with the sample 16 in some embodiments. In another embodiment (not shown), the markers are recessed and extend into the stamp from the surface 72 (similar to the sample holder 80 shown in FIG. 10).

The unique configurations and locations of the individual markers 22 of the stamp 70 may be stored in a database and subsequently used once the reference frame of the stamp 70 has been associated with the sample 16, for example, to locate targets of interest within the sample 16 or implement digital processing of images of the sample 16 in some illustrative applications. For example, once a marker 22 is identified on the sample 16, a database may be used to provide the virtual U,V coordinates for the identified marker 22 to provide information regarding a location of the sample corresponding to the identified marker 22 and which may be used to locate a target 30 of interest in one example.

In addition, although some markers are referred to as having different numbers and arrangements of components (e.g., blocks 46, 48 and flags 60, 62, 64), the individual components of a single marker are typically not identifiable from one another as the blocks and flags of the single marker may be patterned in the stamp 70 as a single continuous protrusion (or recess) which includes the respective blocks and flags of the marker.

Figure 9:
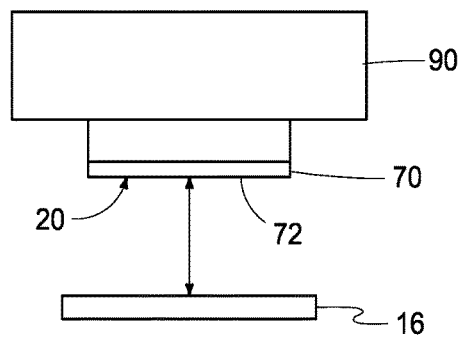
FIG. 9 is an illustrative representation of a press according to one embodiment.

Referring to FIG. 9, one embodiment of a press 90 is shown which may be used to associate reference frames 20 with samples 16. In particular, press 90 is configured to hold the stamp 70 in a position where the surface 72 faces the sample 16 and the press operates to move one or both of the stamp 70 and sample 16 relative to the other such that the markers 22 of reference frame 20 which extend outwardly of surface 72 contact and protrude into the sample 16 to associate the reference frame 20 and markers 22 with the sample 16 in one embodiment. In some uses, the samples 16 are deformable and the protrusion of the markers 22 into the sample 16 deforms the sample 16 and embeds the reference frame 20 and markers 22 in the form of indentations into the sample 16 thereby associating the reference frame 20 and markers 22 with the sample 16. Stamp 70 may be cleaned after being used to associate its respective reference frame with a sample.

Figure 10:
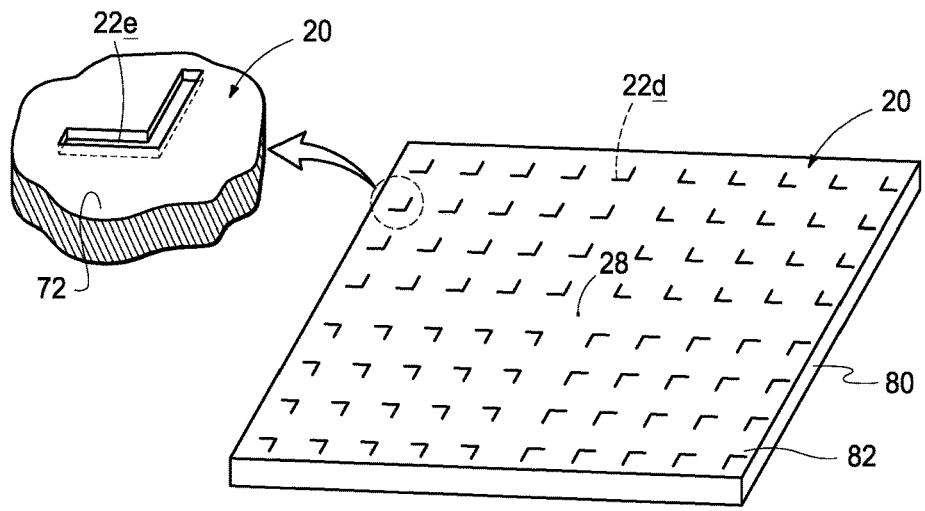
FIG. 10 is an illustrative representation of a sample holder according to one embodiment.

Referring to FIG. 10, one embodiment of a sample holder 80, such as a microscope slide or planchette, is shown which may be used to hold a sample (not shown in FIG. 10). For example, the sample holder 80 may be used to hold the sample during analysis of the sample including movement of the sample between different instruments. Sample holder 80 includes a support surface 82 which is configured to receive the sample in one embodiment. The support surface 82 includes reference frame 20 and markers 22, and the markers 22 are configured to be associated with the sample upon placement of the sample upon the support surface of the substrate.

For example, in the illustrated embodiment, the reference frame 20 includes markers 22e which extend inwardly from an upper surface 82 of sample holder 80 and which form a plurality of depressions or recesses in the surface 82 in the form of a mold. A sample may be placed upon the upper surface 82 of sample holder 80 and portions of the sample (e.g., portions of a deformable sample, powdered sample, liquid sample, etc.) may extend into the recessed markers 22e of the mold which operates to associate the reference frame 20 with the sample 16 in one embodiment. In some illustrative examples, the sample holder 80 is a glass or carbon slide, and the markers 22e of the reference frame 20 are etched into surface 82. In some embodiments, the sample 16 is not moved relative to the sample holder 80 after placement or other association of the sample with the sample holder (and reference frame thereof).

In addition, another sample holder (not shown) may be used in some implementations which has markers 22 which extend outwardly from an upper surface (similar to the stamp of FIG. 8). Similar to the arrangement of FIG. 10, the placement of a sample upon the upper surface of the sample holder having the raised markers operates to associate the sample with the sample holder. For example, the raised markers may protrude into a deformable sample and form indentations therein corresponding to the locations and shapes of the markers. In one embodiment, the raised markers of the reference frame of this example sample holder may be formed of ink by printing the ink upon the upper surface of the sample holder using a printer (e.g., dot matrix).

The reference frame and markers may be associated with the samples in different ways and which may depend upon the form of the samples themselves in other embodiments. For example, in another embodiment, the reference frame and markers may be provided as a transferable ink upon a sample-receiving surface of the sample holder, and transferred to a sample placed upon the sample holder to associate the reference frame with the sample in one embodiment.

In other example embodiments, the reference frame may be laser engraved into the sample, a rubber stamp may be used to provide the reference frame and markers in the form of a transferable ink upon a surface of the sample, or the reference frame and markers may be projected as light onto a light sensitive surface of the sample. In one embodiment, the ink of the markers which is transferred to the sample may be fluorescent.

Illustrative examples of processing and analyzing samples are described below. In a first example, a sample holder of a microscope is initially marked with the markers of the reference frame. A laser scribe tool may be used to inscribe the markers of the reference frame upon the sample holder in the form of a carbon (or other) planchette. The sample of interest, such as a powder or other form of sample, is then placed on the planchette. The L pattern markings allow mapping of the location and relocation of objects of interest on the planchette. The location-relocation may be accomplished by a human or machine using object recognition.

In second example, a sample is marked on a sample holder of a microscope. For a sample holder in the form of a glass slide or other substrate, markers of the reference frame are placed on the slide, or on the sample mounted to the slide, using a printer such as an inkjet printer. Features of the sample may be catalogued by noting their positions relative to the pattern of markers of the reference frame. These features may thereafter be unambiguously located by reference to the virtual coordinate system of the reference frame, regardless of damage or deformation to the sample.

In another example, biological samples are marked for light microscopy, while preserving sample features from markings. More specifically, the markers of the reference frame are printed on a sample or slide using clear fluorescent ink. The sample may then be observed without the markers of the reference frame being present using appropriate visible light sources, and the markers may be toggled off and on by illumination with a fluorescence-inducing light wavelength. The notation of sample features and properties may then be accomplished without obscuring any sample details in this illustrative example.

In an additional example, samples are marked for detection across visualizations. For a sample to be investigated using scanning electron microscopy (SEM), light microscopy (LM), or autoradiography (AR), mark the sample or sample holder with the markers of the reference frame using radioactive colored ink. The markers may be visualized as colored marks in LM, topographic features in the SEM, and as distributed radioactivity in AR. Place a sample on a marked slide or use a marked sample, and although the physical attributes of the sample visible via LM, compositional and nanoscale physical features visible via SEM, or radioactivity visible via AR are mutually not observable across the three methodologies, the three attributes (or even lack of attributes in the case of radioactivity) may be readily correlated using the markers of the reference frame.

Another example provides macroscale marking for identification of time-series sample changes. In this example, a sample is a construction site, for example a parking lot, which is marked with appropriately scaled markers of the reference frame. Construction progress may then be evaluated using direct or passive (e.g., satellite) imaging systems. The deformation of the marked site may be evaluated, along with removal or relocation of site components.

An alternative example of quantifying change over time is the monitoring of deformation of a thin tissue section due to dehydration. An inkjet printer could deposit the markers of the reference frame onto a fresh tissue section. After the tissue deforms under some controlled environmental condition (heat, humidity, etc.), the location and amount of deformation can be determined by comparing the before and after distribution of markers.

In example embodiments discussed above, the markers 22 of the reference frame 20 individually have an "L" shape. In other embodiments, the markers are formatted to comprise alternative shapes. In another example, an individual marker may include one or more square blocks with attributes representing values of 0 or 1, such that each block acts similarly to a bar code, but in which the sequence of conformations represents a progression on one or more sample axes. The sequence is analogously readable by human or machine systems, and the methodology is implemented in the same manner as described above for L-shaped markers 22 in example implementations.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended aspects appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A sample processing method comprising:
providing a physical sample;
associating a reference frame with the sample, wherein the reference frame comprises a plurality of markers arranged in a predefined pattern and wherein individual ones of the markers are uniquely identifiable from others of the markers;
identifying a location of a target of the sample with respect to at least one of the markers;
storing the location of the target with respect to the at least one marker;
after the storing, locating the target within the sample using the stored location and the at least one marker; and
wherein the physical distance between the target and the at least one marker changes after the storing and before the locating.

2. The method of claim 1 wherein the reference frame has a plurality of axes, and wherein the markers individually have a plurality of legs which are aligned with the axes and at least one flag, and wherein the legs and the at least one flag indicate the location of the individual marker with respect to the axes.

3. The method of claim 1 wherein the markers comprise different and unique arrangements of components which identify the respective locations of the markers in the reference frame.

4. The method of claim 1 wherein the markers comprise different numbers of components which identify the respective locations of the markers in the reference frame.

5. The method of claim 1 wherein the markers include different arrangements of components which uniquely identify the markers.

6. The method of claim 1 wherein the markers individually have a unique outline which uniquely identifies the individual marker.

7. The method of claim 1 further comprising identifying locations within the sample using shapes of the markers.

8. The method of claim 1 wherein the associating comprises providing the markers upon a surface of the sample.

9. The method of claim 1 wherein the associating comprises extending the markers into the sample.

10. The method of claim 1 wherein the reference frame has a plurality of sub-areas which individually comprise different ones of the markers, and the markers are configured to indicate which of the plurality of sub-areas they are located within.

11. The method of claim 1 wherein the markers are configured to individually indicate their orientation within the reference frame.

12. The method of claim 1 wherein the markers are configured to individually indicate their location within the reference frame.

13. The method of claim 1 further comprising, after the associating, using the markers to reconstruct the sample.

14. The method of claim 1 wherein the markers are individually located a predefined distance from adjacent ones of the markers in the reference frame.

15. The method of claim 1 wherein the markers have a base form and a plurality of flags which indicate locations of the markers in the reference frame.

16. An article of manufacture comprising non-transitory storage media configured to store programming configured to control processing circuitry to control the associating of claim 1.

17. An instrument configured to perform the associating of claim 1.

18. The method of claim 1 wherein the markers are arranged in the predefined pattern prior to the associating.

19. The method of claim 1 wherein the markers are arranged in the predefined pattern upon a substrate, and the associating comprises placing the sample upon the substrate.

20. The method of claim 1 wherein the associating comprises permanently associating the markers of the reference frame with the sample.

21. The method of claim 1 wherein the sample is one of a solid, particulate, powder, or liquid.

22. The method of claim 1 wherein the associating comprises contacting the markers with the sample which physically associates the markers with different portions of the sample.

23. The method of claim 1 further comprising:
placing an entirety of the sample upon a support surface of a substrate to associate the markers of the reference frame with the sample; and
using the substrate to support the entirety of the sample.

24. The method of claim 1 wherein the identifying comprises identifying using a first instrument, and the locating the target comprises locating using a second instrument.

25. The method of claim 1 further comprising, after the associating, using the markers to register the sample with respect to an instrument.

26. The method of claim 1 wherein the markers arranged in the predefined pattern individually correspond to respective unique coordinates of a coordinate system, and further comprising identifying the markers using the respective coordinates.

27. The method of claim 26 wherein the predefined pattern is a grid.

28. The method of claim 1 further comprising providing a sample holder having a surface which includes the markers, and wherein the associating comprises providing the sample upon the surface of the sample holder.

29. The method of claim 28 wherein the markers comprise depressions within the surface of the sample holder.

30. The method of claim 28 wherein the markers comprise protrusions which extend outwardly from the surface of the sample holder.

* * * * *

UNITED STATES PATENT AND TRADEMARK OFFICE
CERTIFICATE OF CORRECTION

PATENT NO. : 10,649,198 B2  
APPLICATION NO. : 15/068447  
DATED : May 12, 2020  
INVENTOR(S) : Micah D. Miller et al.

Page 1 of 1

It is certified that error appears in the above-identified patent and that said Letters Patent is hereby corrected as shown below:

In the Specification

Column 1, Line 9 – Replace "Contract DE-AC0576RLO1830" with --Contract DE-AC05-76RL01 830--

Column 5, Line 10 – Replace "simply be changing" with --simply by changing--

Column 5, Line 13 – Replace "more smaller markers" with --smaller markers--

Column 13, Line 6 – Replace "father from" with --farther from--

Column 16, Line 24 – Replace "In second example," with --In a second example,--

Signed and Sealed this  
Ninth Day of November, 2021

Drew Hirshfeld  
*Performing the Functions and Duties of the*  
*Under Secretary of Commerce for Intellectual Property and*  
*Director of the United States Patent and Trademark Office*